A. L. LARSEN.
TRACTOR DRAFT CONNECTION.
APPLICATION FILED DEC. 20, 1919.
1,371,100.
Patented Mar. 8, 1921.
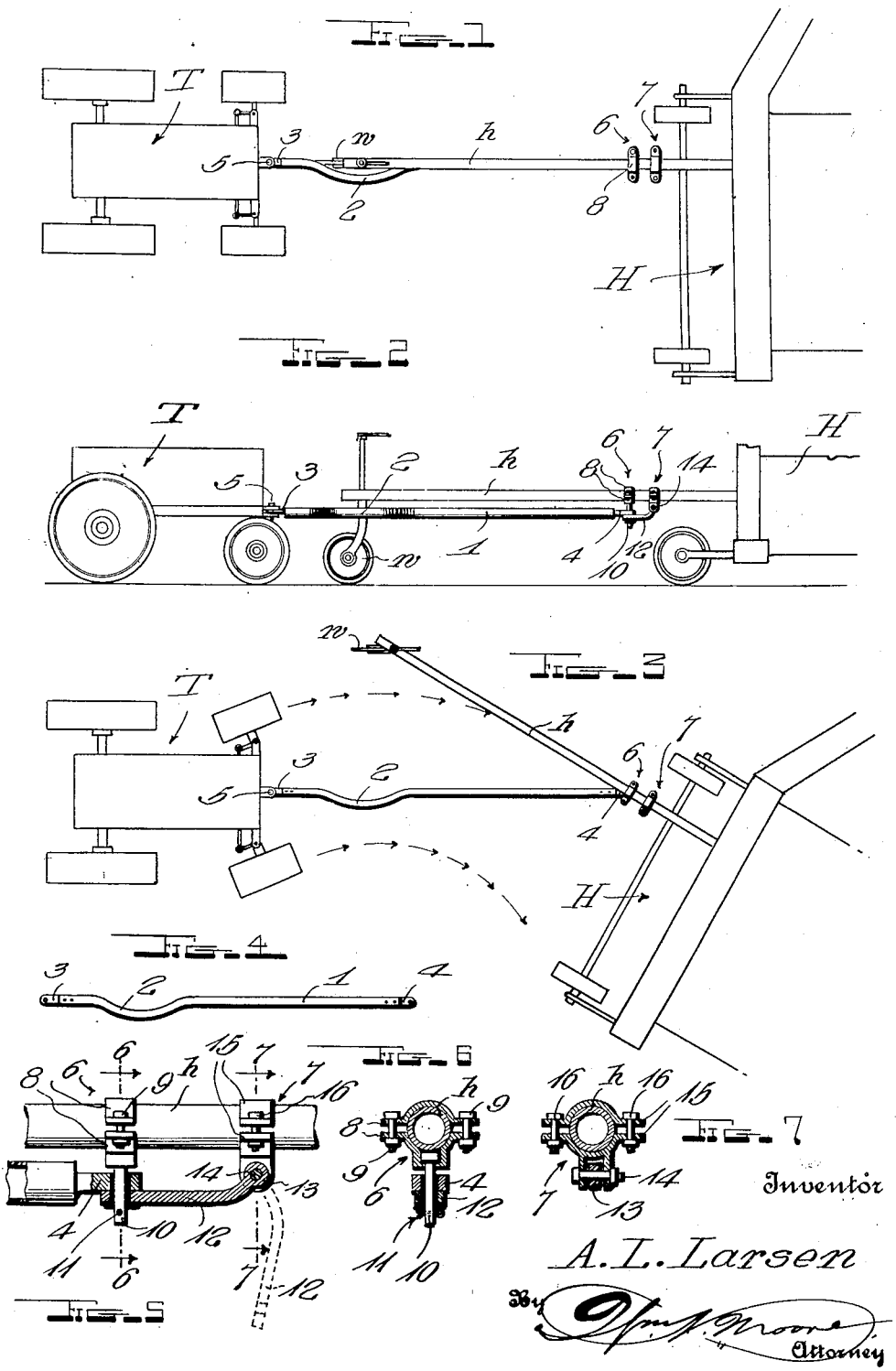
Inventor
A. L. Larsen

UNITED STATES PATENT OFFICE.

AAGE L. LARSEN, OF BENMORE, UTAH.

TRACTOR DRAFT CONNECTION.

1,371,100. Specification of Letters Patent. Patented Mar. 8, 1921.

Application filed December 20, 1919. Serial No. 346,423.

*To all whom it may concern:*

Be it known that I, AAGE L. LARSEN, a citizen of the United States, residing at Benmore, in the county of Tooele and State of Utah, have invented certain new and useful Improvements in Tractor Draft Connections, of which the following is a specification.

My invention relates to improvements in Tractor Draft Connections, and refers particularly to a draft connection between a tractor and a header, although it is not limited to such use, but may be employed in any situation where it would perform its functions in a practical and efficient manner.

One object of my invention is the provision of a draft connection between a tractor and header which will cause the header to be pushed over the field in a straight line and which when necessary to turn will cause the header to make an easy turn according to the travel of the tractor and thus render the turning of the tractor with connected header easy of accomplishment.

Another object of my invention is the provision of a draft connection of the character stated which will permit an adjustment of the turn to be made and which will be of simple, strong and durable construction, capable of quick and ready application, inexpensive to produce, and in general prove reliable, efficient and practical.

With these and other objects in view the invention consists in certain novel features of construction and combination of parts, substantially as shown, described and particularly defined by the claims.

Figure 1 is a top plan view of my improvement in connection with a tractor and header.

Fig. 2 is a side elevation thereof.

Fig. 3 is a top plan view showing the position the parts assume when making a turn.

Fig. 4 is a plan view of the draft bar.

Fig. 5 is a detail view of the adjustable connection between the draft bar and header beam.

Fig. 6 is a section on line 6—6 of Fig. 5, and

Fig. 7 is a section on line 7—7 of Fig. 5.

In order that the construction in detail and the operation of the invention may be understood and its many advantages be appreciated, the drawings will now be described and referred to by proper reference letters and numerals, and in said drawings:

The letter T designates the tractor, H the header and *h* the beam extending rearward from the header, in the rear end of which is mounted the ground, guiding or steering wheel *n*. Between the header and tractor is arranged the tubular draft bar 1, formed centrally with the bend 2, which admits the bracket or hanger of the steering or guide wheel *n*, while said draft bar is formed at its ends with eyes 3 and 4, for connection with the tractor and with the header beam at 5, while upon the bar near its connection with the header are the pair of brackets 6 and 7, the bracket 6 consisting of upper and lower members 8, connected by bolts 9, while the bracket 7, consists of upper and lower members 15, connected by bolts 16.

This construction provides a pair of similar yoke brackets which clamp upon the draft bar and are capable of adjustment thereon to vary the angle of turn and the brackets are retained in proper adjustment by the link 12, pivoted by its eye 13, to pivot 14, and having its free end formed with an opening to engage pin 10, and be retained in the desired adjustment by means of the cotter pin 11, all as clearly shown, and the securing link 12, would be provided with a series of openings along its free end to engage the bolt 10, and thus permit adjustment of the pair of clamping brackets, according to the angle of turn required.

From the foregoing description taken in connection with the drawings the operation of my improvement will be easily understood, and it will be apparent that the tractor is connected to the header or other implement and is pushed over the ground, and when required to make a turn, the turning of the tractor causes the header beam and draft bar to move to the position shown and accordingly cause the header to swing around in a neat and smooth manner and to accomplish the turn with absolute ease and precision, thus providing a practical and useful improvement for the purpose desired.

I claim:

1. In combination with a tractor and an implement having a beam extending rearwardly therefrom and provided with a steering wheel at one end, a tractor connection including a bar pivotally connected at its rear end to the tractor and at its front end to an intermediate portion of said beam, said bar being offset at its middle portion to clear the steering wheel.

2. In combination with a tractor and an implement having a beam extending rearwardly therefrom and provided with a steering wheel at one end, a tractor connection including a bar to be connected at one end to the tractor, clamp brackets adjustably mounted on said beam, and a pin carried by said clamp brackets by which the remaining end of said bar is pivotally connected and held.

In testimony whereof I affix my signature.

AAGE L. LARSEN.